United States Patent [19]

Boutet et al.

[11] Patent Number: 5,334,852

[45] Date of Patent: * Aug. 2, 1994

[54] CASSETTE AUTOLOADER

[75] Inventors: John C. Boutet; Walter C. Bubie; Darryl D. DeWolff, all of Rochester; Jeffrey J. Yaskow, Williamson, all of N.Y.

[73] Assignee: Eastman Kodak Company, Rochester, N.Y.

[*] Notice: The portion of the term of this patent subsequent to Jan. 17, 2011 has been disclaimed.

[21] Appl. No.: 981,640

[22] Filed: Nov. 25, 1992

[51] Int. Cl.⁵ .................................... G01N 23/04
[52] U.S. Cl. .................................... 250/589
[58] Field of Search ..................... 378/181, 204; 250/327.2 J, 589, 590; 212/306, 234.4, 234.5

[56] References Cited

U.S. PATENT DOCUMENTS

| | | | |
|---|---|---|---|
| 2,738,251 | 3/1956 | Corum | 312/312 |
| 2,848,292 | 8/1958 | Lewis | 312/234.4 |
| 4,277,120 | 7/1981 | Drake et al. | 312/320 |
| 4,417,260 | 11/1983 | Kawai et al. | 250/327.2 |
| 4,695,103 | 9/1987 | MacDonald et al. | 312/18 |
| 4,789,782 | 12/1988 | Ohara | 250/327.2 |
| 5,059,772 | 10/1991 | Younglove | 360/92 |

Primary Examiner—Carolyn E. Fields
Attorney, Agent, or Firm—Dana M. Schmidt

[57] ABSTRACT

An apparatus for storing and automatically delivering mechanism cassettes and/or pallets containing cassettes to a reader. A storage and delivery is provided which defining a plurality of cassette retaining sites. A body encases the storage and delivery mechanism and has a portal adjoining the cassette loading sites for allowing casettes to be placed on or removed from the storage and delivery mechanism. Indicia is provided on panels adjacent the portal for identifying the cassette retaining sites and a guide bar is placed in front of the cassette read site. The panels are mounted to the apparatus by elastomeric mounts so as to minimize or prevent transmission of shock vibrations.

26 Claims, 9 Drawing Sheets

CASSETTE AUTOLOADER

CROSS REFERENCE TO RELATED APPLICATIONS

Reference is made to the following commonly assigned copending U.S Application:

Ser. No. 902,214, entitled "X-ray Cassette Positioner", filed Jun. 22, 1992 in the name of John C. Boutet, now U.S. Pat. No. 5,278,410, issued Jan. 11, 1994;

Ser. No. 800,799 filed Nov. 27 1991, entitled "X-ray Cassette Having Removable Photographic Element" by Jeffrey C. Robertson, now U.S. Pat. No. 5,276,333, issued Jan. 4, 1994.

BACKGROUND OF THE INVENTION

The present invention pertains to equipment used in processing photosensitive material, and more particularly to an autoloader for feeding cassettes and/or pallets containing cassettes to and receiving them from a computed radiographic reader.

It is convenient to handle storage phosphorous film/plates within cassettes that protect the film from extraneous light and damage. Storage phosphorous film is read by photoelectrically detecting an image formed by scanning with stimulating radiation. An example of such a scanner/reader is disclosed in U.S. Pat. No. 4,789,782 to O'Hara. It is desirable to retain the x-ray film within a cassette except during actual processing. Such a cassette is disclosed in U.S. patent application Ser. No. 800,799, filed Nov. 27, 1991, entitled "X-ray Cassette Having Removable Photographic Element" by Jeffrey C. Robertson, which is incorporated herein by reference. A hook extractor can be used with the x-ray cassette to remove the photographic element for scanning in the x-ray reader. It is desirable to provide an apparatus to automate the presentation of such x-ray cassettes or similar cassettes to such an extractor so that a number of x-ray cassettes could be processed in succession without attention from an operator. It is also desirable that such an apparatus be able to accurately position x-ray cassettes and/or pallets containing cassettes sequentially to simplify removal and reinsertion of the photographic elements and that the presentation apparatus be separate from the x-ray reader to permit interchange of units and reduce repair time. An example of a suitable device for presenting cassettes is disclosed in copending application U.S. Ser. No. 902,214 filed Jun. 22, 1992, entitled "X-ray Cassette Positioner" of John C. Boutet et al which is also hereby incorporated by reference. In this reference there is disclosed a positioner/autoloader for use with a plurality of x-ray cassettes and/or pallets containing cassettes which comprise first and second cog belts spaced apart so as to provide a plurality of cassette retaining sites one of which defines a cassette read site for presenting of the cassette to the reader. The belts are driven such that the cassettes are each individually positioned at the read site for removal of the photosensitive film therein for reading by the reader after which it is returned to the cassette. The positioner allows a plurality of individual cassettes to be placed thereon for automatic supplying to the reader thus freeing the operator to accomplish other duties. It is important that the mechanism be designed to operate in such a manner so as to minimize any transfer of vibrations from the autoloader to the reader which can adversely affect the reader reading the information stored on the photo stimulable phosphorous film. Typically the autoloader will be loaded or unloaded during scanning of the photostimulable phosphorous film in the adjacent reader. The cassettes are manually loaded and unloaded from the cassette loading and unloading sites. Generally the operator will be loading or unloading a plurality of cassettes. During this procedure the operator must align the sides of the cassettes with axially spaced shelves. Thus, there is the possibility that the cassette will be banged against the sides of the autoloader adjacent the portal which could cause objectionable vibrations to be transmitted to the reader. Since the shelves forming the cassette retaining sites are spaced apart, the operator must rely on his or her ability to visually align the sides of the cassette with the appropriate opposed aligned shelves. If the cassette is not properly inserted into the cassette site, the cassette could be placed at an angle between non aligned shelves which would result in the autoloader stopping when the autoloader senses the misalignment.

In accordance with the present invention there is provided means for minimizing transfer of vibrations to the reader which can adversely affect the reading of the photographic element and means for assisting the operator to quickly and easily load cassettes between properly aligned shelves of the cassette retaining sites.

SUMMARY OF THE INVENTION

In accordance with one aspect of the present invention there is provided an apparatus for storing and automatically delivering cassettes and/or pallets containing cassettes to a reader, comprising:

storage and delivery means defining a plurality of cassette retaining sites and a body encasing said storage and delivery means, the body having a portal adjoining the cassette sites for allowing casettes to be placed on or removed from the storage and delivery means, the improvement comprising:

indicia means adjacent the portal for identifying the cassette retaining sites.

In accordance with another aspect of the present invention there is provided an apparatus for storing and automatically delivering cassettes and/or pallets containing cassettes to a reader, comprising:

storage and delivery means defining a cassette read site and a plurality of cassette retaining sites, means for moving the storage and delivery means so as to transfer cassettes located in the retaining sites serially through the read site, and a body encasing the storage and delivery means, the body having a portal adjoining the cassette sites for allowing cassettes to be placed on or removed from the storage and delivery means, the improvement comprising:

means for preventing accidental removal of the cassette from the read site.

In accordance with yet another aspect of the present invention there is provided an apparatus for storing and automatically delivering cassettes and/or pallets containing cassettes to a reader, comprising:

storage and delivery means defining a cassette read site and a plurality of cassette retaining sites, means for moving the storage and delivery means so as to transfer cassettes located in the retaining sites serially through the read site, and a body encasing the storage and delivery means, the body having a portal adjoining the cassette sites for allowing cassettes to be placed on or removed from the storage and delivery means, the improvement comprising:
  guide means secured to the body adjacent the portal;
  means for minimizing transmission of shock vibrations from the guide means to the body.

BRIEF DESCRIPTION OF THE DRAWINGS

In the detailed description of the preferred embodiment of the invention presented below reference is made to the accompanied drawing, in which.

DESCRIPTION OF A SPECIFIC EMBODIMENT

Figure 1:
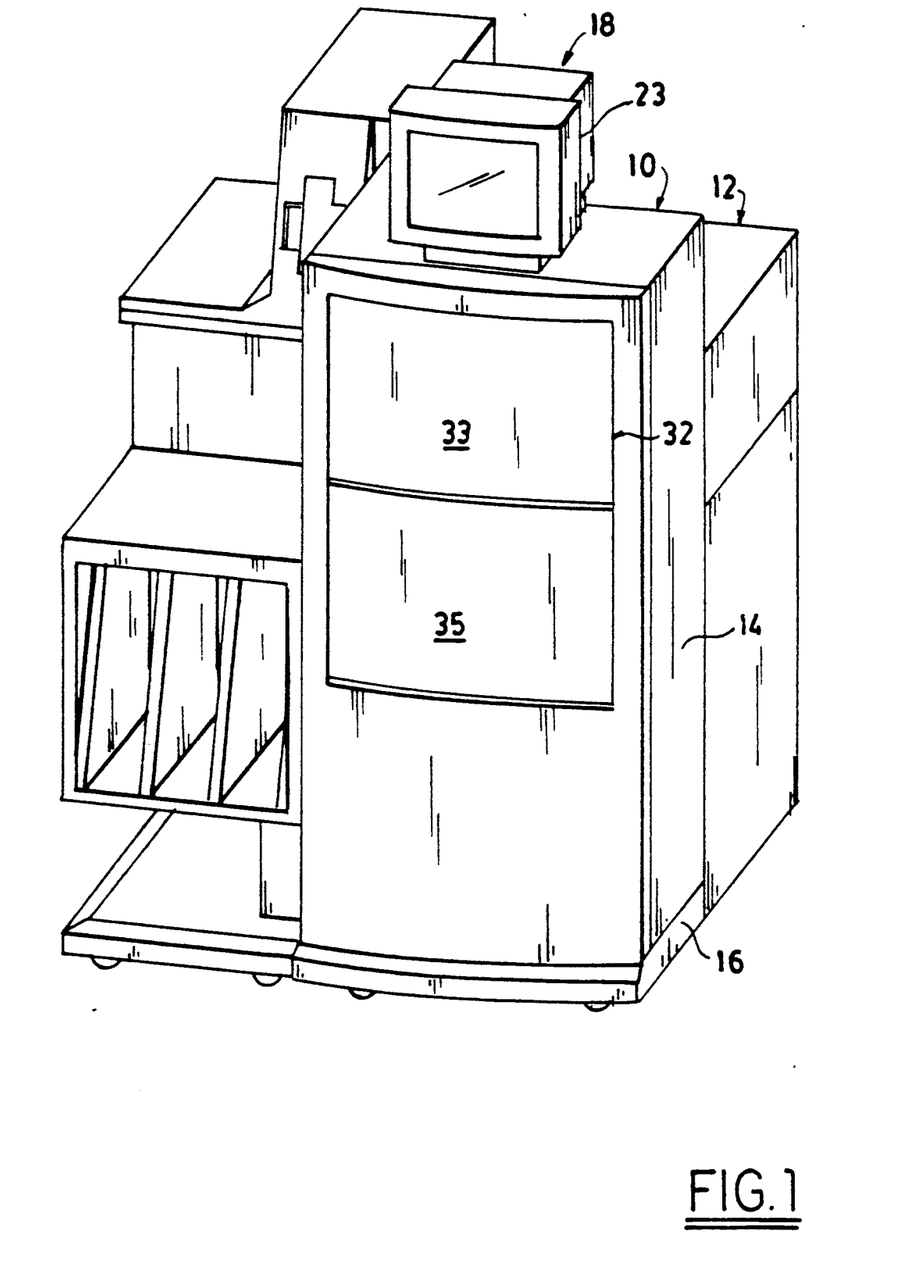
FIG. 1 is a front perspective view of an x-ray cassette autoloader made in accordance with the present invention along with an x-ray reader and monitor illustrating the door assembly in the closed position and the retractable shelf in the retracted position.
Figure 2:
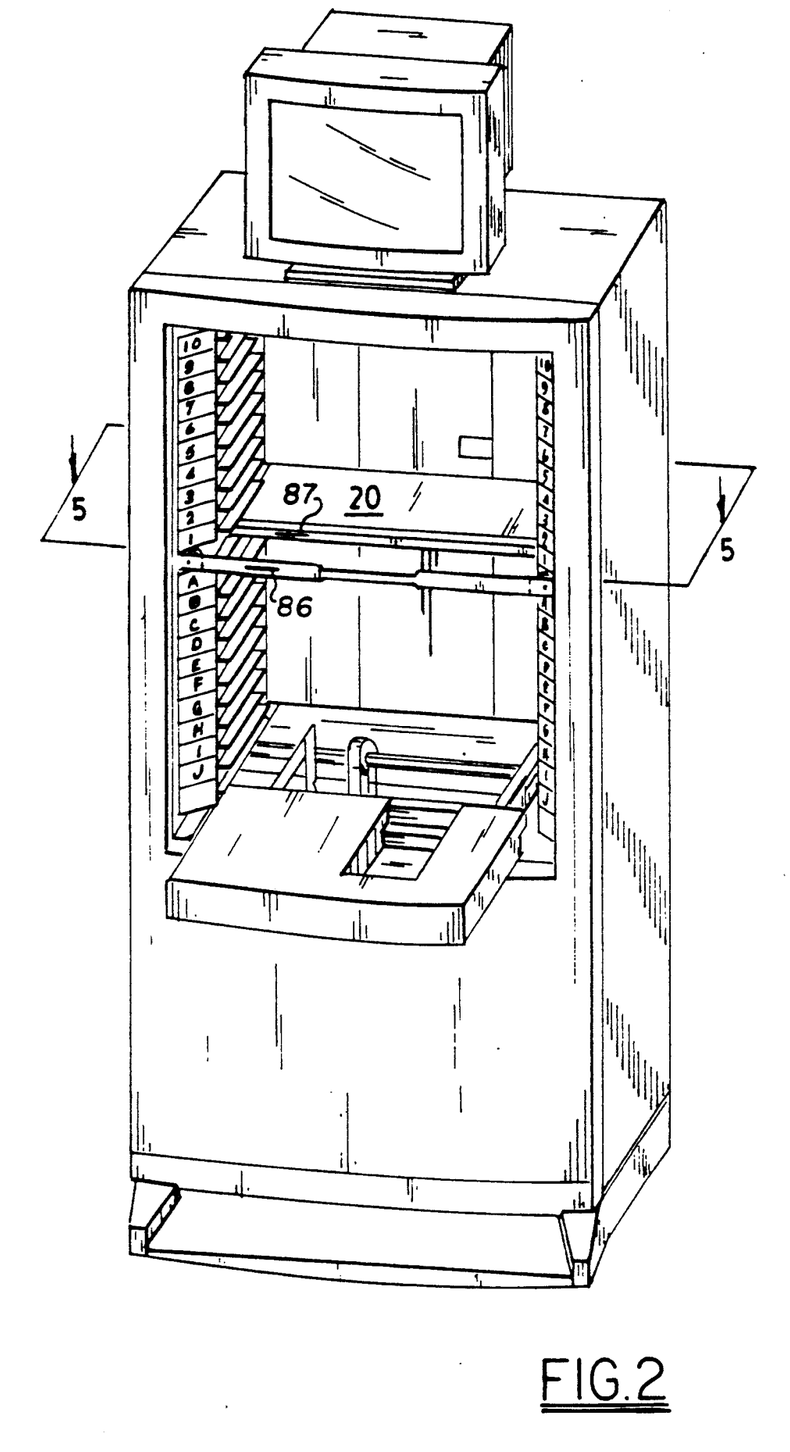
FIG. 2 is a view similar to FIG. 1 illustrating the cassette autoloader with the door assembly in the open position and the retractable shelf in the extended position.
Figure 2A:
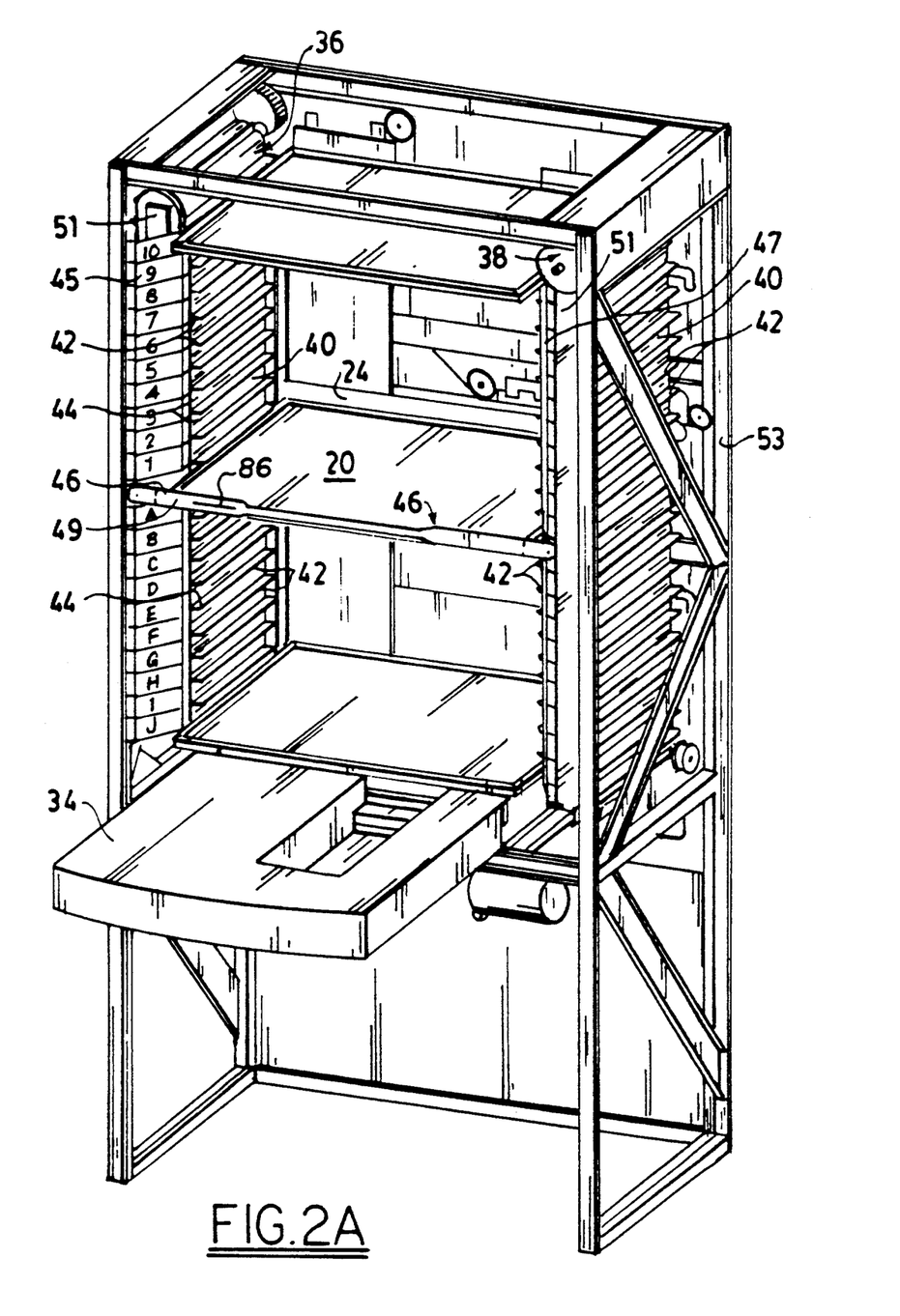
FIG. 2A is a perspective view of the autoloader of FIG. 2 with the outer shell removed illustrating the cog belts used to move and store the cassettes.

Referring to FIG. 1 there is illustrated an autoloader (10) made in accordance with the present invention positioned directly in front of an X-ray reader (12). FIGS. 2 and 2A illustrate the autoloader 10 by itself. The autoloader (10) has a body (14) with a base (16) at the bottom and a monitor station (18) on top. The body (14) can be made of sheet metal or the like reinforced as necessary to support loads imposed by the autoloader components and x-ray cassettes (20) or pallets containing cassettes. The cassette (20) is of the type wherein the photosensitive material is removed through one of the sides of the cassette such as that described in pending application of Jeffrey C. Robertson, U.S. Ser. No. 800,799, previously referred to herein. Briefly, the cassette comprises a shell having upper and lower panels and three side caps joining the upper and lower panels, and an removable end cap. A photographic element, such as a stimulable phosphor plate, is provided within the cassette and is secured to the removable end cap. The end cap includes a latching mechanism for releasing the end cap from the cassette. A latch bar having at least one hook is used to latch or unlatch the latching mechanism. It is to be understood that other cassette construction may be used as appropriate, such as that disclosed in U.S. Pat. No. 5,065,866 and U.S. Pat. No. 5,090,567. A further example of a suitable pallet for use in the autoloader (10) is described in copending application Ser. No. 981,710, filed Nov. 25, 1992 entitled "Pallet for Holding a Cassette" of John Boutet, James F. Owen, Wayne Arseneault, Jeff Yaskow, and T. Dale Baker which is also hereby incorporated by reference. Monitor station (18) may include some means for preventing inadvertent movement of the monitor (23), such as indentations. At the rear, body (14) has an access opening (24), as best seen by reference to FIG. 2A, through which the forward end of a cassette is passed so that the forward end of the cassette (20) is placed within the adjacent x-ray reader (12). At the front, body (14) has a portal (26) which is generally rectangular in shape and provides access to the interior of body (14). Facing portal (26) is an operator station, which may be occupied by an operator. Door assembly (32) of body (14) is operable between a closed position, as shown in FIG. 1, in which the portal (26) is closed and an open position, as shown in FIG. 2 in which the interior of body (14) is accessible through portal (26). The operation and function of door assembly (32) is set forth in greater detail in copending application Ser. No. 981,674, filed Nov. 25, 1992 entitled "Door Assembly For Cassette Autoloader" filed concurrently herewith of Wayne Arseneault, John C. Boutet, Darryl D. DeWolff, James Lattimore, Gary Shope, T. Dale Baker, and Jeffrey J. Yaskow, which is hereby incorporated by reference. Briefly, the door assembly includes a pair of panels (33),(35) slideably mounted to body (14) such that when in the closed position the portal (26) is closed. However, for the purpose of this invention any door assembly desired may utilized.

Autoloader (10) includes a retractable table (34), which can be moved between an extended stacking position, as shown in FIG. 2, and a storage retracted position inside body (14). In the storage retracted position the retractable table (34) is disposed totally within the body (14) so that the door assembly (32) can be closed as shown in FIG. 1. Table (34) can be used to hold x-ray cassettes (20) and/or pallets (22) containing cassettes during loading and unloading. The details of the construction and operation of the retractable table (34) is described in greater detail in copending application Ser. No. 981,630, filed Nov. 25, 1992 of John C. Boutet, Darryl D. DeWolff, James Lattimore, James J. Sheridan and Jeffrey J. Yaskow entitled "Autoloader Having a Retractable Shelf". Alternatively, x-ray cassette (20) can be loaded or unloaded from a cart (not shown). Controls are provided to permit the operator to either open the door assembly (32) and have the table (34) extended automatically or to open only the door (32) without extending of the retractable table (34). A wide variety of means may be employed for controlling operation of the autoloader which are well known in the prior art. In the particular embodiment illustrated the autoloader is provided with a microprocessor which is appropriately linked up to various switches, motors and controls to operate the door assembly and retractable table and various other functions of the device in a pre-set pattern. Such controls are well known and therefore will not be discussed further.

Referring to FIG. 2A the autoloader is provided with a first and second conveyor assemblies (36),(38), respectively. Each conveyor assembly (36), (38) is provided with an endless cog belt (40). Each cog belt (40) having a plurality of regularly spaced shelves (42). The cog belts (40) are aligned and driven such that the shelves (42) provide a plurality of vertically arranged cassette retaining sites (44) within body (14). In line with the center of access opening (24) there is provided a read site (46) whereby the cassette when placed in such position can be advanced for reading into the adjacent x-ray reader (12). The cassette retaining sites (44) above reading site (46) are loading sites wherein cassettes which have yet to be read are placed. Cassette retaining sites (44) below read site (46) are unloading sites from which scanned and erased cassettes can be removed. While only one read site is provided, any number of cassette loading and unloading sites may be provided as desired. In the particular embodiment illustrated, there are provided ten loading sites and ten unloading sites. To prevent accidental placement or attempted removal of a cassette from read site (46), a guide bar (49) is secured to body (14) in front of read site 46. Cassettes (20) can be interchanged between loading sites easily since each cassette is supported by a pair of vertically aligned shelves (42), and shelves (42) are spaced apart from each other by a distance sufficient to permit each individual cassette (20) to be gripped while positioned fully to the back of every cassette retaining site (44).

The cog belts (40) are driven in unison by a drive means provided. An example of a mechanism used to drive cog belts (40) is more fully described in copending application U.S. Ser. No. 902,214 previously referred to herein. Such mechanism is used to in seriatim place cassettes at the read site for removal of the photosensitive material and delivery to the reader and to unloading sites after the photosensitive material has been returned to the cassette.

Figure 4:
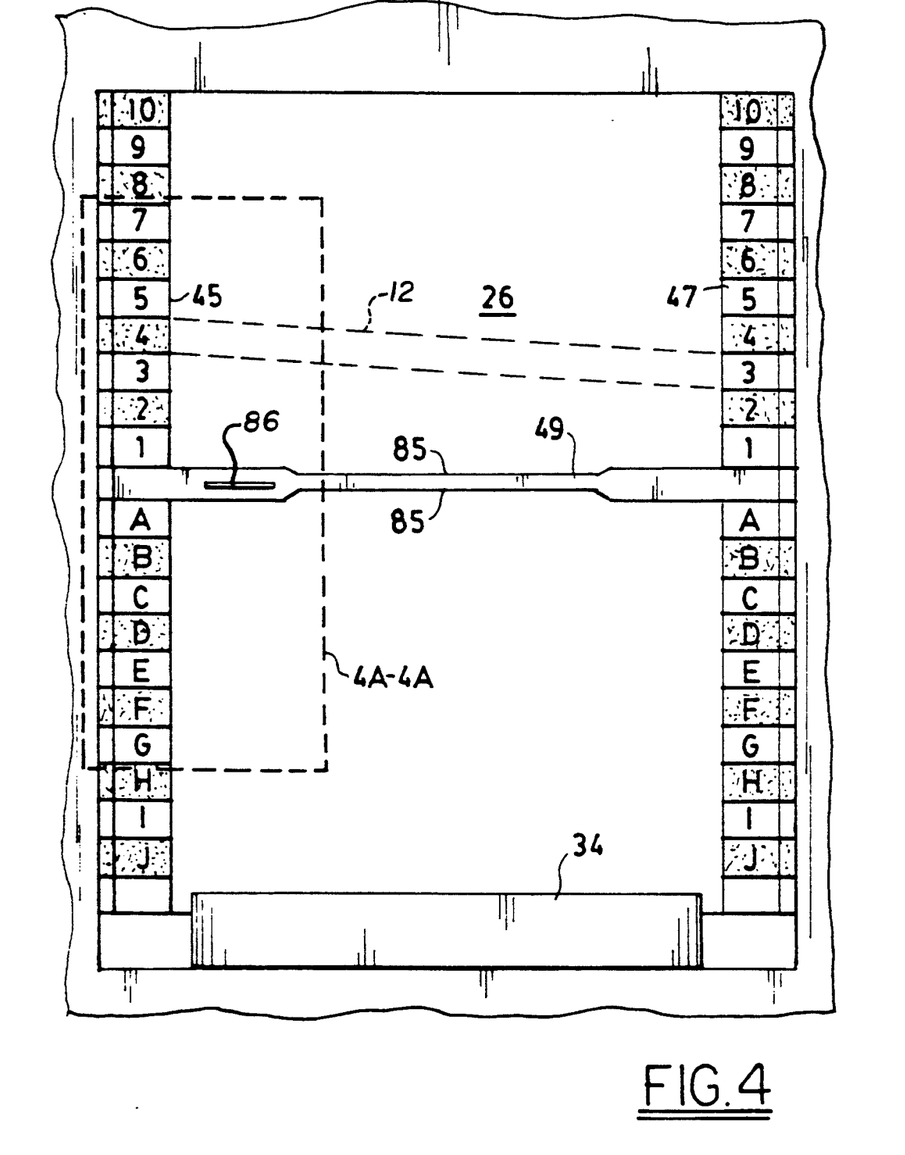
FIG. 4 is an enlarged partial frontal elevational view of the autoloader of FIG. 2.

To assist in quickly identifying the loading sites and/or unloading sites, the side panels (45), (47) adjacent portal (26) are provided with identifying indicia. In the particular embodiment illustrated the loading sites are identified by numerals, one through ten, placed on side panels (45),(47) as shown in FIG. 2A and 4 and the cassette unloading sites (44) below read site (46) are preferably identified by different indicia from that of loading sites. In the particular embodiment illustrated, the unloading sites are identified by letters and in particular, by the letters A-J. The indicia on the sides panels (45),(47) is such that con, non indicia on opposed side panels (45),(47) indicate a particular cassette site. For example, the numeral 1 on the side panels (45),(47) indicates the loading site directly above the read site, likewise the numeral 2 indicates the second loading site above the read site. This sequence is continued for the remainder of the numbers. A casette in loading site 1 will have the lateral sides in the positions indicted by the numeral 1. This allows the operator to quickly visually align the shelves of one cog belt with the shelves of the opposed cog belt which define a particular cassette retaining site. This also allows the operator to quickly see if a cassette has been improperly placed on the shelves as shown by dash lines in FIG. 4. This further allows the autoloader to identify possible areas where a problem may exist. To further assist in locating individual loading sites, additional indicia may also be used in conjunction with the numerals. In the particular embodiment illustrated the even numerals are provided with different background than that of the odd numerals so as to produce different color stripes and the background for the odd numerals is a white color and the background for the even numerals is a light gray color. The numbers and lines between the numbers are green in color. It is, of course, understood that countless other indicia combinations could be employed.

As previously discussed, letters are used to differentiate the unloading sites from the loading sites. As with the indicia used to identify the loading sites additional means can be used to identify different unloading sites. In the particular embodiment illustrated, alternate letters "A" "C" "E" "G" and "I" have a white background and the remaining alternate letters have a light gray background. The letters and the lines between the numbers are red in color. To further assist in differentiating loading sites from unloading sites lines of arrows (61) pointing into the portal (26) can be placed between adjacent loading sites and lines of arrows (63) pointing away from portal (26) can be placed between unloading sites as best seen by reference to FIG. 4A.

It is, of course, to be understood that the indicia used to assist the operator identifying the loading site as opposed to the unloading may be varied as desired. Referring to FIGS. 7-10, there is illustrated but only a few of these variations.

Figure 5:
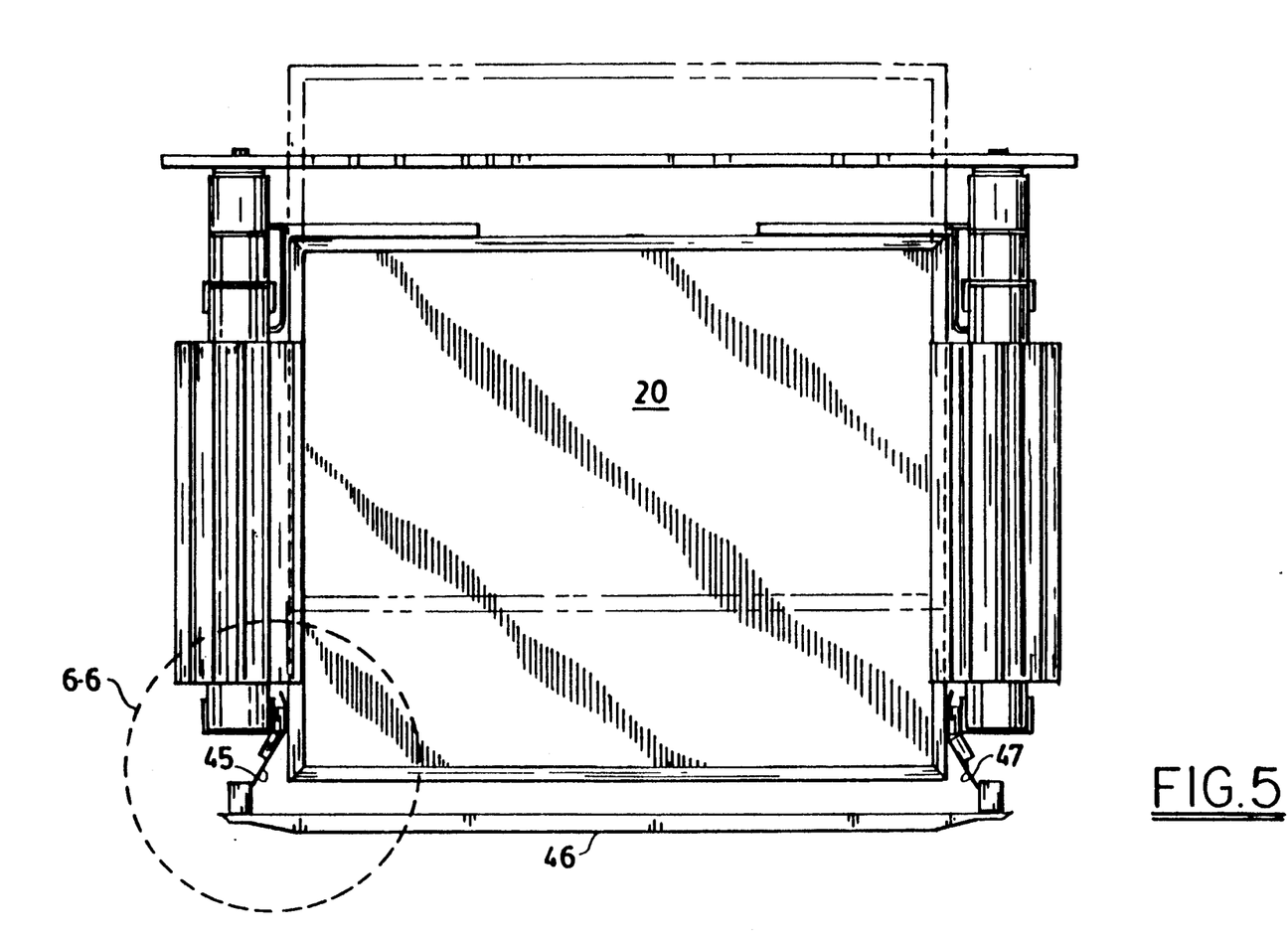
FIG. 5 is a top plan view of a cassette in the autoloader as taken along line 5—5 of FIG. 2.
Figure 6:
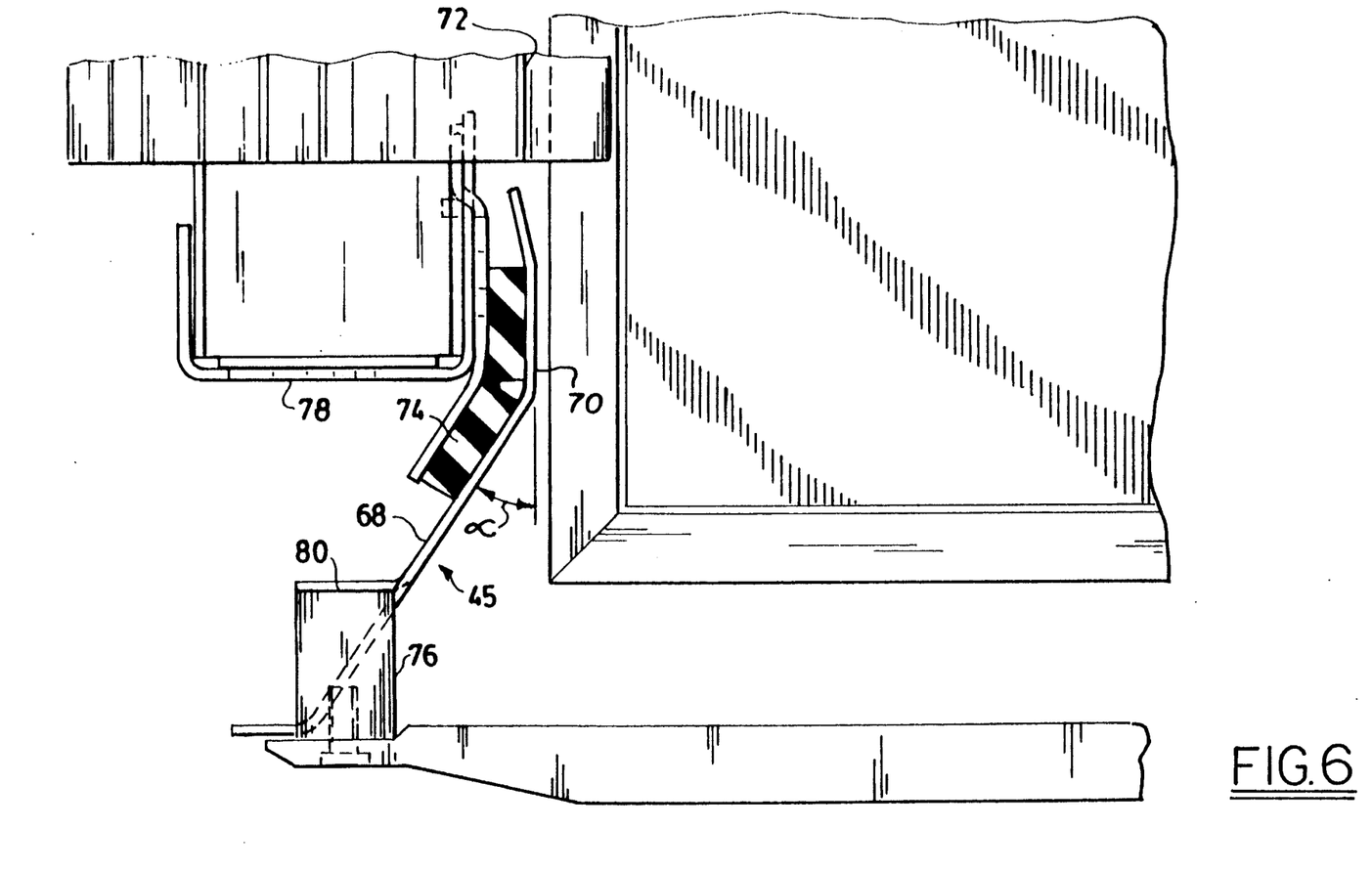
FIG. 6 is an enlarged view of one of the guide bar assemblies as outlined by line 6—6 of FIG. 5.
Figure 7:
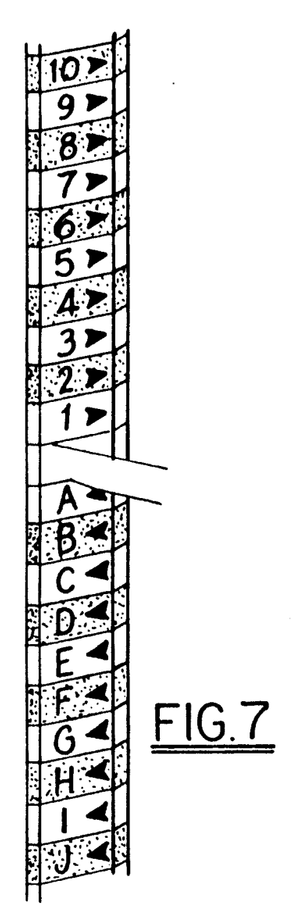
FIGS. 7-10 are enlarged partial elevational views of alternate embodiments of the locating indicia on the guide bar assemblies.
Figure 8:
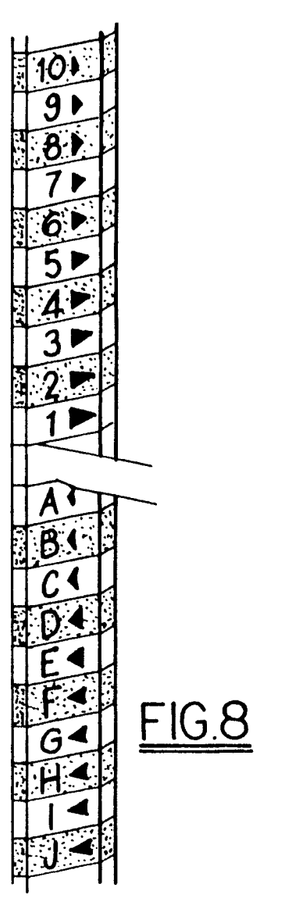
Figure 9:
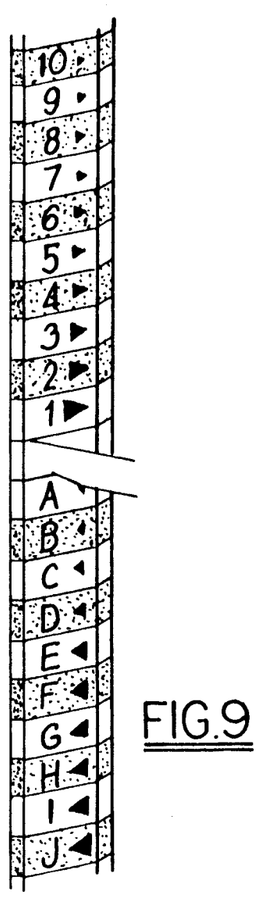
Figure 10:
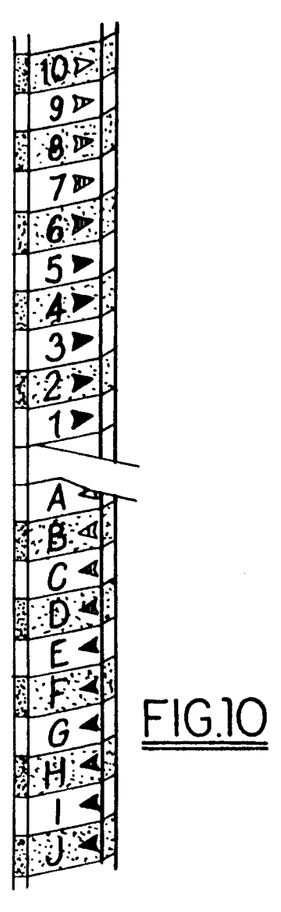

The panels (45),(47) also serve to assist in guiding the cassettes into the cassette retaining sites. As best seen by reference to FIGS. 5 and 6, the panels (45),(47) each comprise guide section (68) and a rear mounting section (70). The rear mounting section (70) is substantially parallel to the side (72) of the adjacent cog belt which forms one side of the cassette retaining site as is best seen in FIG. 6. While only one of the guide panels, panel (45), is shown in FIG. 6, it is to be understood that the other guide panel, panel (47), is similarly constructed. The guide section (68) extends from the rear mounting section (70) at an angle $\alpha$ with respect to a plane which is parallel to the direction of insertion of the cassette into the autoloader. The angle $\alpha$ may have a wide range of angles. Generally angle $\alpha$ ranges from about 10 degrees to about 60 degrees, preferably from about 20 to about 45 degrees. In the particular embodiment illustrated angle $\alpha$ is about 33 degrees. As might be expected, the guide panels are subject to repeated hitting during insertion of the cassettes into the cassette retaining sites which can produce shock vibrations which can affect the adjacent reader. In order to minimize this problem the guide panels (45),(47) are vibration isolation mounted to the autoloader (10). In particular, the panels (45),(47) are each mounted to the autoloader by elastomeric mounts (74) located along the length of the panels. The elastomeric mounts are made of a material which does not transmit vibration readily therethrough. In particular, mounts (74) are made of a urethane foam material which absorbs shocks. In the embodiment illustrated, mounts (74) were made of Isoloss LS 1525 Urethane purchased from EAR Inc. In the preferred embodiment illustrated the mounts (74) are secured to central guide section (68) and the frame (78) of the adjacent conveyor assembly. Thus, if the one of the conveyors is repositioned so that the autoloader can accept different size cassettes, there will be no need to remove and readjust the panels. The mounts (74) may be secured to frame (78) and guide panel (45) in any desired manner. In the particular embodiment illustrated an adhesive is applied between the surface of the mount (74) and adjacent frame and panel. The forward end of the guide section (68) at the read site is attached to a standoff (76) by means of a tab (80) formed in the panel (45). The front end of standoff (76) is secured to guide bar (49). Any shocks introduced to the guide bar (49) are absorbed by the mounts (74) associated with each panel (45),(47). Accordingly little or no vibrations will be transmitted to the reader.

Figure 3:
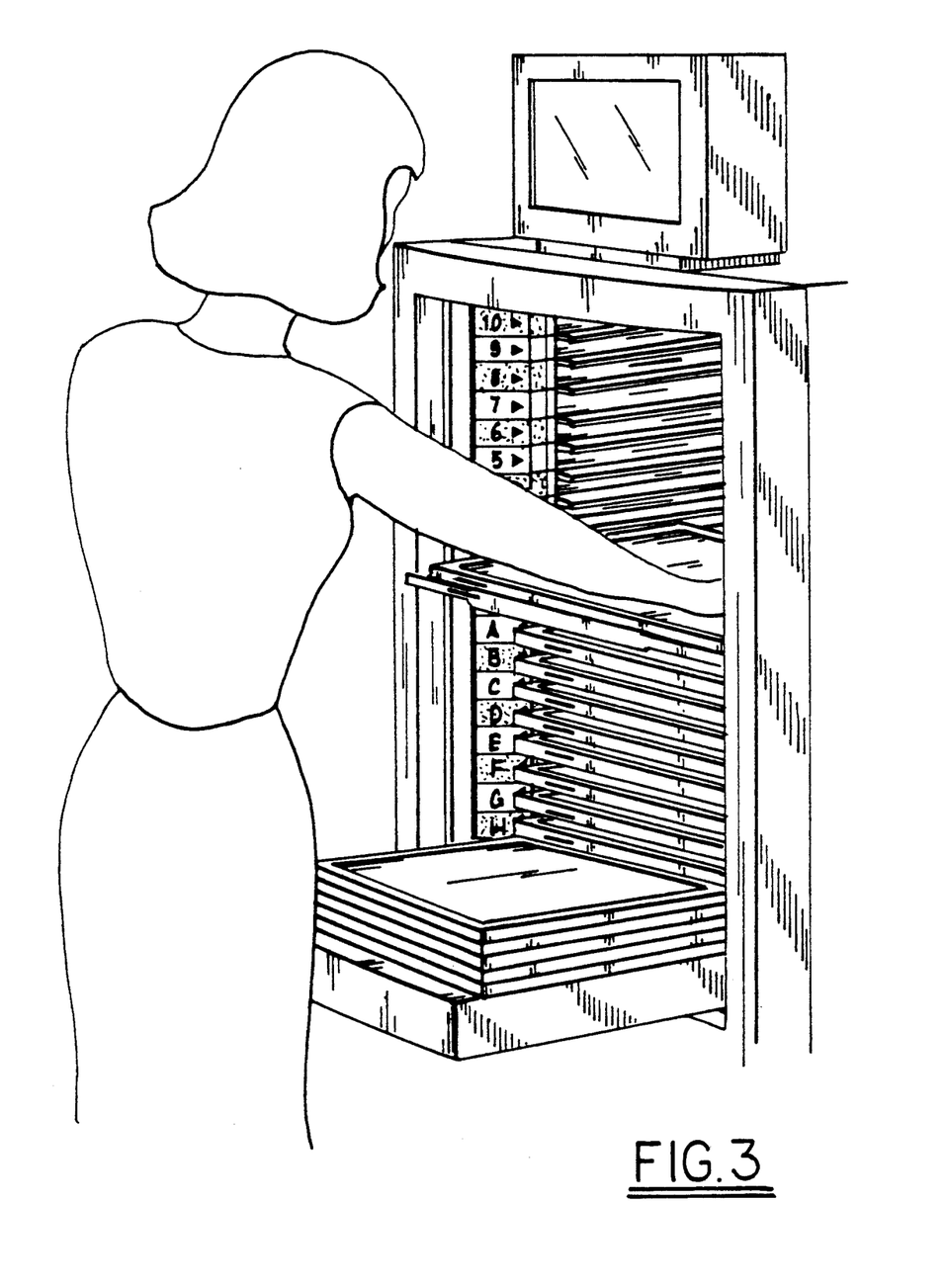
FIG. 3 is a partial perspective view of the autoloader 2 illustrating an operator placing cassettes into the loading sites.
Figure 4A:
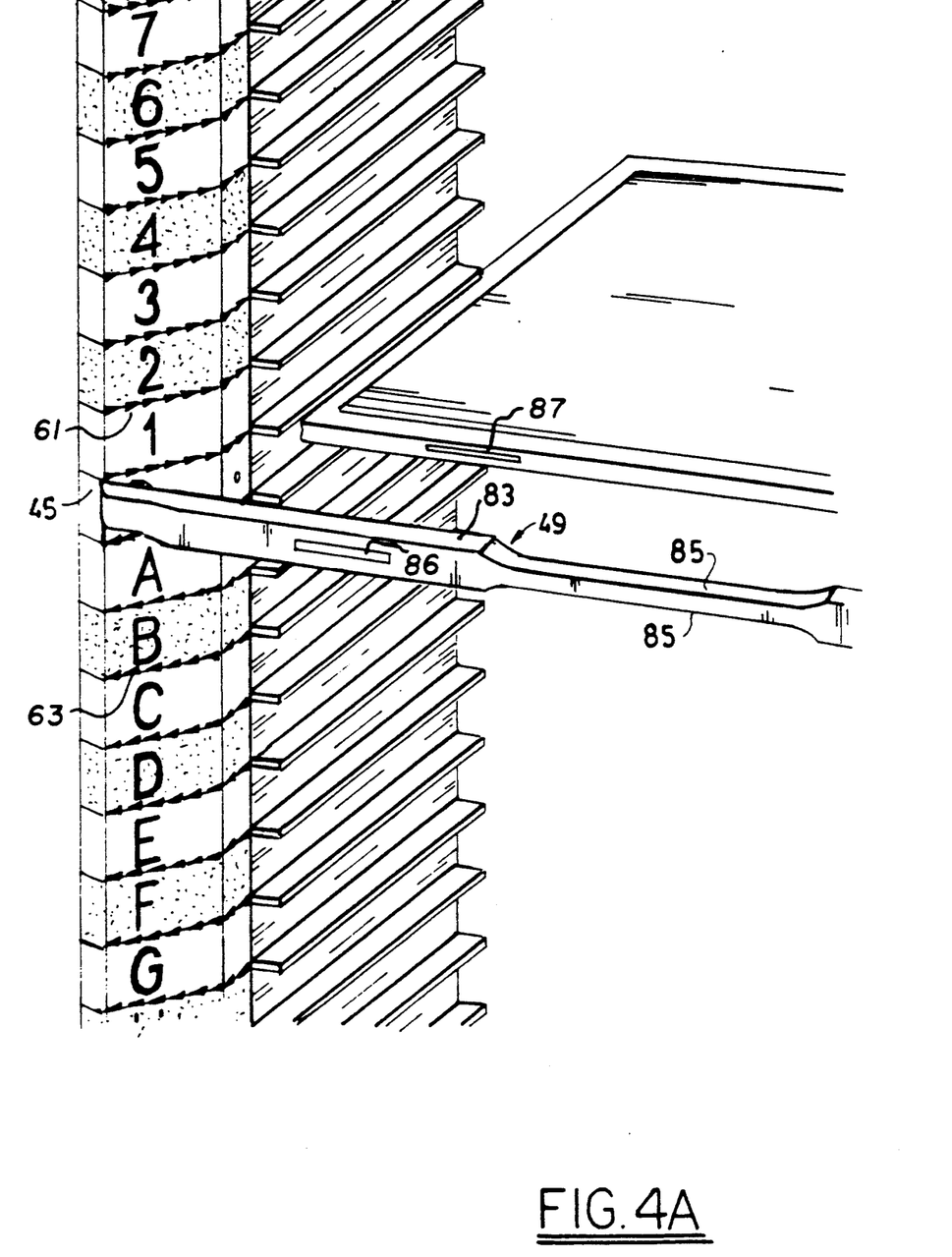
FIG. 4A is an enlarged partial of the autoloader of FIG. 4 as taken along line 4A illustrating in greater detail the indicia on one of the guide panels.

The guide bar (49) prevents cassettes from being inserted into or removed from the read site. In the embodiment illustrated the guide bar (49) is also designed to assist the operator in placing cassettes into the autoloader. The guide bar (49) is provided with a top edge (83), the guide being positioned on the panels so that the top edge (83) corresponds with the bottom of the loading site directly above the read site. Thus, the operator can rest the front portion of a cassette on the top edge (83) and then simply slide the cassette into the adjacent loading site identified by the numeral 1. The operator can use the filled loading site #1 for to further assist in identifying the next loading site directly above. The guide bar (49) is provided with cut out sections (85) to assist the operator in placing or removing cassettes in the cassette sites above and below the read site. Additionally, a guide strip (86) is placed on guide bar (49) in an asymmetric manner. In the embodiment illustrated, guide strip (86) is disposed in the left half of the guide bar (49). Guide strip (86) is designed to align with a guide strip (87) placed on the back edge of cassette and/or pallet containing a cassette so that when the cassette (or pallet) is properly placed in the shelves, the guide strips (86),(87) will be vertically aligned as best illustrated in FIGS. 2, 3 and 4A. Likewise, the guide strip placed on a pallet will align with the cassette it is designed to hold and thus also make loading of the cassette easier. Preferably, guide strips are a strip of a color different from the guide bar and cassette. In the embodiment illustrated, guide strips (86),(87) are yellow.

The present invention provides means in an autoloader for minimizing transfer of vibrations to a reader which can adversely affect the reading of the photographic element and means for assisting the operator to quickly and easily load cassettes between properly aligned shelves of the loading sites.

It is to be understood that various modifications may be made to the present invention without departing from the scope of the present invention. The present invention being limited by the following claims.

We claim:

1. In an apparatus for storing and automatically delivering cassettes and/or pallets containing cassettes to a reader, comprising:
storage and delivery means defining a plurality of cassette retaining sites wherein cassettes are loaded and unloaded, a read access site and a body encasing said storage and delivery means, said body having a portal adjoining said cassette retaining sites for allowing cassettes to be placed on or removed from loading and unloading sites in the storage and delivery means, the improvement comprising:
indicia means adjacent said portal for identifying the cassette retaining sites, said indicia means comprising numeric symbols for identifying loading sites and letters for identifying unloading sites.

2. In an apparatus according to claim 1 further comprising a pair of guide panels on both sides of the portal.

3. In an apparatus according to claim 2 further comprising means for minimizing transmitting shock vibrations from cassettes striking the guide panels to the adjacent reader.

4. In an apparatus according to claim 3 wherein said means for minimizing transmitting of shock vibrations to the reader comprises mounting said guide panels to said apparatus by the use of elastomeric mounts.

5. In an apparatus according to claim 2 wherein said guide panels each comprise a rear mounting section and a guide section, said rear mounting section being adjacent the side of the cassette retaining sites, said guide section extending outward and away from said rear mounting section at a predetermined angle.

6. In an apparatus according to claim 5 wherein said predetermined angle ranges from about 10 to 60 degrees.

7. In an apparatus according to claim 5 wherein said predetermined angle ranges from about 20 to 45 degrees.

8. In an apparatus according to claim 5 wherein said predetermined angle is about 33 degrees.

9. In an apparatus according to claim 1 wherein said indicia means for identifying the loading sites comprises a plurality of stripes of a first color and said indicia means for identifying the unloading sites comprises a plurality of stripes of a second color.

10. In an apparatus according to claim 1 wherein said storage and delivery means further defines means for transferring cassettes in said loading sites serially to said loading sites and then to said unloading sites.

11. In an apparatus according to claim 1 further comprising means for moving said storage and delivery means so as to transfer cassettes located in said loading sites serially through said read access site.

12. In an apparatus for storing and automatically delivering cassettes and/or pallets containing cassettes to a reader, comprising:
storage and delivery means defining a plurality of cassette retaining sites, a read access site, and a body encasing said storage and delivery means, said body having a portal adjoining said cassette retaining sites for allowing cassettes to be placed on or removed from the storage and delivery means, the improvement comprising:
indicia means adjacent said portal for identifying the cassette retaining sites, and a guard bar placed across the read access site, said bar being constructed and positioned to prevent accidental removal of a cassette from said read access site.

13. In an apparatus for storing and automatically delivering cassettes and/or pallets containing cassettes to a reader, comprising:
storage and delivery means defining a plurality of cassette retaining sites each comprising a loading and unloading site, a read access site, and a body encasing said storage and delivery means, said body having a portal adjoining said cassette retaining sites for allowing cassettes to be placed on or removed from the storage and delivery means, the improvement comprising:
indicia means adjacent said portal for identifying the cassette retaining sites, and means for moving said storage and delivery means so as to transfer cassettes located in said loading sites serially through said read access site, said moving means comprising:
first and second conveyors, said conveyors having a first endless cog belt and a second endless cog belt, respectively, said cog belts being spaced apart, said cog belts each having a plurality of outwardly extending shelves in vertical alignment so as to define said read access and a plurality of cassette loading sites, means for driving conveyors in unison to transfer cassettes loaded in said loading sites serially through said loading sites and said read site, and a body encasing said conveyors, said body having a portal adjoining said cassette retaining sites for allowing cassettes to be placed on or removed from the shelves of the cog belts.

14. In an apparatus for storing and automatically delivering cassettes and/or pallets containing cassettes to a reader from a read access site, comprising:
storage and delivery means defining a plurality of cassette retaining sites, and a body encasing said storage and delivery means, said body having a portal adjoining said cassette sites for allowing cassettes to be placed on or removed from the storage and delivery means, the improvement comprising:
indicia means adjacent said portal for identifying the cassette retaining sites, and a guard bar across said read access site, said guide bar being provided with a guide means for alignment with guide means provided on a cassette and/or pallet containing a cassette designed for placement in the cassette retaining sites.

15. In an apparatus according to claim 14 wherein said guide means on said guide bar and said cassette and/or pallet containing a cassette comprises a colored strip.

16. In an apparatus for storing and automatically delivering cassette and/or pallets containing cassettes to a reader, comprising:
first and second conveyors, said conveyors having a first endless cog belt and a second endless cog belt, respectively, said cog belts being spaced apart, said cog belts each having a plurality of outwardly extending shelves in vertical alignment so as to define a cassette read access site and a plurality of cassette retaining sites, means for driving conveyors in unison to transfer cassettes loaded in said retaining sites serially through said read access site, and a body encasing said conveyors, said body having a portal adjoining said cassette retaining sites for allowing cassettes to be placed on or removed from the shelves of the cog belts, the improvement comprising:
indicia means adjacent said portal for identifying cassette loading sites.

17. In an apparatus according to claim 16 further comprising a pair of guide panels on both sides of the portal.

18. In an apparatus according to claim 21 further comprising means for minimizing transmitting shock vibrations to the adjacent reader from cassettes striking the guide panels.

19. In an apparatus according to claim 18 wherein said means for minimizing transmitting of shock vibrations to the reader comprises mounting said guide panels to said apparatus by the use of elastomeric mounts.

20. In an apparatus according to claim 17 wherein said guide panels each comprise a rear mounting section and a guide section, said rear mounting section being adjacent the side of the loading sites, said central guide section extending outward and away from said rear mounting section at a predetermined angle.

21. In an apparatus according to claim 16 further comprising means for preventing accidental removal of the cassette from the read access site.

22. In an apparatus according to claim 21 wherein said means for preventing accidental removal of the cassette from the read access site comprises a guide bar placed across the read access site.

23. In an apparatus according to claim 16 wherein said cassette retaining sites comprise cassette loading and unloading sites, said indicia means comprising numeric symbols for identifying the loading sites and letters for identifying the unloading sites.

24. In an apparatus according to claim 14 or 16 wherein said cassette retaining sites comprise cassette loading and unloading sites, and said indicia means comprise a plurality of stripes of a first color for identifying the loading sites, and a plurality of stripes of a second color for identifying the unloading sites.

25. In an apparatus for storing and automatically delivering cassette and/or pallets containing cassettes to a reader, comprising:
first and second conveyors, said conveyors having a first endless cog belt and a second endless cog belt, respectively, said cog belts being spaced apart, said cog belts each having a plurality of outwardly extending shelves, said conveyors each having a pair of cogwheels, each said pair of cogwheels receiving a respective said cog belt, said cog belts each having a utilization segment and a return segment, said shelves of said utilization segment of said first cog belt facing and being in vertical alignment with corresponding shelves of said utilization segment of said second cog belt, the aligned shelves defining a cassette read access site and a plurality of cassette retaining sites, a positive drive operatively connected to both said conveyors to drive said conveyors in unison to transfer cassettes loaded in said loading sites serially through said retaining sites and said read access site, and a body encasing said conveyors, said body having a portal adjoining said cassette sites;
guide means secured to said body adjacent said portal, said guide means having indicia means for identifying said loading sites for receiving said cassettes.

26. The apparatus of claim 25 wherein said cassette retaining sites comprise a plurality of cassette loading sites and a plurality of cassette unloading sites, and said positive drive transfers cassettes loaded in said loading sites serially from said loading sites through said read access site to said unloading sites.

* * * * *